United States Patent [19]

Hargitay

[11] 4,341,631
[45] Jul. 27, 1982

[54] ULTRAFILTRATION AND REVERSE OSMOSIS DEVICE COMPRISING PLURAL CARBON TUBES BONDED TOGETHER

[75] Inventor: Bartholomew Hargitay, White Plains, N.Y.

[73] Assignee: Union Carbide Corporation, Danbury, Conn.

[21] Appl. No.: 211,680

[22] Filed: Dec. 1, 1980

Related U.S. Application Data

[63] Continuation of Ser. No. 73,295, Sep. 7, 1979, abandoned.

[51] Int. Cl.³ .............................................. B01D 31/00
[52] U.S. Cl. ................................ 210/323.2; 210/433.2
[58] Field of Search ................... 128/DIG. 3; 422/48; 55/16, 158; 210/323.2, 433.2, 497.1, 456, 496, 321

[56] References Cited

U.S. PATENT DOCUMENTS 3,704,223 11/1972 Dietzsch et al. ............. 210/321.1 X
4,176,070 11/1979 Sakurada et al. .................. 422/48 X
4,220,535 9/1980 Leonard .......................... 210/456 X

*Primary Examiner*—Charles N. Hart
*Assistant Examiner*—David R. Sadowski
*Attorney, Agent, or Firm*—John R. Doherty

[57] ABSTRACT

An improved multi-tubular module is provided for use in ultrafiltration and reverse osmosis devices. Improved mechanical strength is achieved in the module by bonding the individual tubes to each other at spaced intervals along their total length whereby lateral and axial movement of individual tubes with respect to one another is eliminated, resulting in a coherent monolith of tubes. Additionally, improved resistance to thermal cycling is imparted to the module by connecting the tube sheet or header to the module shell in a manner which allows for slight movement of the tube sheet with respect to the module shell and yet provides a device which can be easily sanitized or sterilized when used for food or drug applications.

5 Claims, 8 Drawing Figures

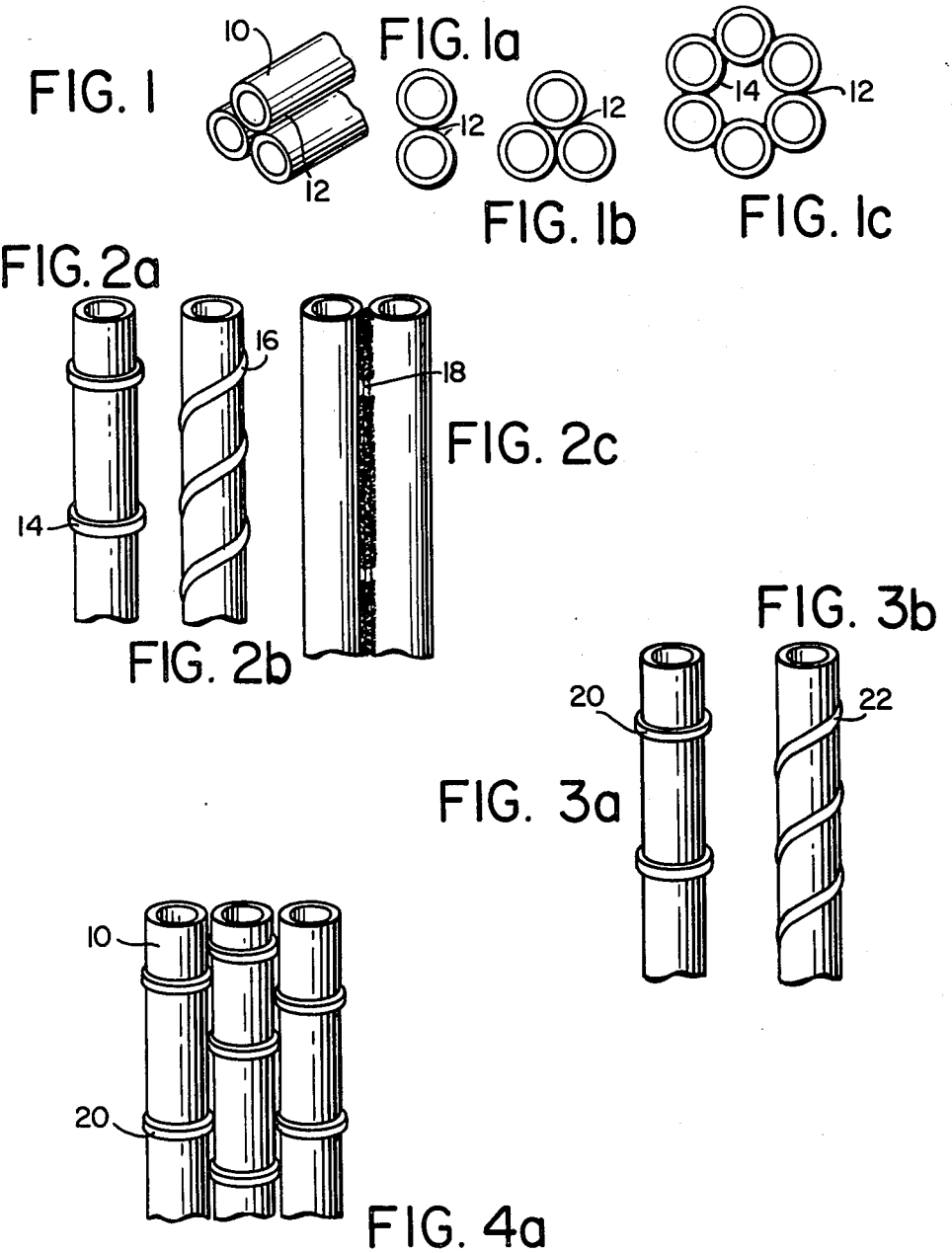

ULTRAFILTRATION AND REVERSE OSMOSIS DEVICE COMPRISING PLURAL CARBON TUBES BONDED TOGETHER

This is a continuation of our prior U.S. application Ser. No. 073,295, filing date Sept. 7, 1979, now abandoned.

This invention relates in general to an improved ultrafiltration and reverse osmosis device. In one aspect this invention relates to a multi-tubular module which is used in such devices and has improved mechanical strength, resistance to thermal cycling and other desirable features over tubular modules presently in use. In a further aspect, this invention relates to a multi-tubular module which has an improved sanitary design wherein the exposed surfaces are devoid of crevices and hence sanitization or sterilization of its surfaces can be easily effected.

Differential thermal expansion is an inherent problem in tubular ultrafiltration and reverse osmosis modules which contain chemically inert porous tubes such as those composed of alumina, silica, zirconia, porous glass, porous carbon and the like, which are enclosed in a shell. Such tubes usually are friable and easily broken. The materials being used in commercially available shells which house the tubes generally exhibit a 3 to 10 times higher thermal expansion than the refractory porous tubes themselves and in many instances lead to untoward stresses during thermal cycling. To avoid this, floating joints have been used to allow a few millimeter axial displacement of the tubes[1]. Unfortunately, such a floating joint, usually an elastomer in a counter sunk hole, presents crevices difficult to clean, and is therefore not acceptable by sanitary standards in food applications[2]. In a module containing more than three tubes it is, of course, impractical to demount the joints for cleaning, as required by 3-A Standards, and therefore a crevice free design is essential.

[1] U.S. Pat. No. 3,977,967.
[2] 3-A Sanitary Standards by Int. Assoc. Milk, Food, and Environmental Sanitarians (U.S. Public Health Service, the Dairy Industry Comitee).

Thus the aforementioned problem encountered with modules of the multi-tubular design is the effect of axial compression during operation. If the tubes used are not absolutely straight, an end-on compression will have a bending component resulting in a buckling effect. In fact, a free standing single carbon tube of 10 mm OD and 120 cm length breaks by buckling under 5 kg axial load.

The present invention circumvents the aforementioned problems of differential thermal expansion and sanitary design by creating a sheaf of tubes which are mutually anchored to each other in spaced intervals by permanent bonds. The net effect of this "fusion" is a reinforcement and high resistance to buckling. Additionally, by making the tube-header joint permanent and the header-shell joint flexible and demountable, the device is easily cleaned or sterilized by steam or known chemical techniques. In fact, the use of a shell becomes totally optional and will, in most cases, by superfluous because the monolith tube-sheaf is self-supporting.

Accordingly, one or more of the following objects can be achieved by the practice of the present invention. It is an object of this invention to provide an improved multi-tubular module for use in ultrafiltration and reverse osmosis devices. Another object of the invention is to provide multi-tubular modules which have improved mechanical strength and resistance to thermal cycling. A further object is to provide ultrafiltration and reverse osmosis systems which have improved sanitary design to facilitate cleaning and sterilization. A still further object of this invention is to provide improved multi-tubular modules which can be fabricated from carbon tubes and employed in ultrafiltration and reverse osmosis devices which are subjected to wide temperature variations. Another object of this invention is to provide a process for fabricating the multi-tubular modules of this invention. These and other objects will readily become apparent to those skilled in the art in the light of the teachings herein set forth.

In its broad aspect, the invention is directed to an improved ultrafiltration and reverse osmosis device whereby individual tubes are bonded together to impart improved mechanical strength and improved resistance to thermal cycling. The device is comprised of, in part, a module containing a plurality of axially aligned hollow, porous tubular members bonded together at spaced intervals along their outer surfaces in a manner whereby lateral and axial movements of individual tubes with respect to one another is eliminated, resulting in a coherent monolith of tubes. Additionally, the ends of the tubes are permanently and rigidly affixed into a header and the header-shell joint made flexible and demountable if the use of a shell is desired.

This invention thus provides a multi-tubular module which has a high resistance to buckling and yet permits permeate to flow freely between adjacent tubes. Additionally, the module is of such a design that it can be easily cleaned and sanitized or sterilized when its use is desired for food or drug applications. Moreover, attachment of the module to the rest of the device is easily effected by conventional means such as those employed in the food industry.

The invention will be more easily understood by referring to the accompanying drawings wherein:

FIGS. 1 through 4 are perspective and elevational views illustrating various methods for affixing the individual tubes together along their lengths.

FIGS. 5a and b are cross-sectional views of a header with and without a shell.

Figure 4B:
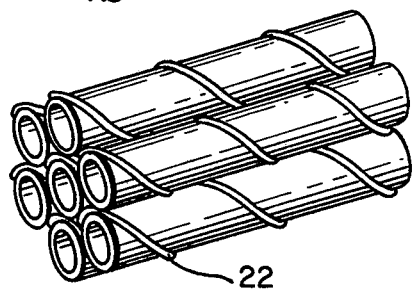

With further reference to the drawings, FIG. 1 depicts the simplest way of bonding the tubes 10 to each other and involves depositing a very thin line of cement along the line of contact 12 of adjacent tubes. This continuous line imparts a very high rigidity and strength to the system but has the disadvantage of rendering a portion of the tube surfaces useless in the permeation process. In addition to the cement-line itself, which is negligible, all surfaces facing the inside of the bundle have no suitable outlet where the permeate could escape. This "condemned" surface 14 can be appreciable and depends on the geometry of the stacking of the tubes. While in the triangular arrangement of the tube end view of FIG. 1(b) only 1/6 is inoperative, in the hexagonal case of the tube end view of FIG. 1(c) ⅓ is useless. While there are ways of opening up this enclosed space, they are awkward and it is preferred that one of the other methods hereinafter described be employed for achieving the optimum properties.

FIG. 2 depicts a means for bonding of tubes wherein attachment of one tube to another is done at spaced intervals. For instance, to permit free drainage of the permeate, one can attach soluble rings 14 or spirals 16 as spacers to the tubes before the tube bundles are formed. These spacers can be dissolved out after the tubes have been cemented to each other as in FIG. 1. Examples of such water soluble spacers are polyethylene oxide tape, polyvinylalcohol tape or fibers calcium alginate fibers, and the like. These materials will readily dissolve in hot water or in mild base, leaving behind holes 18 through which permeate can freely flow. The presence of these interruptions in the cement line does not weaken the system significantly.

FIG. 3 depicts applications where the permeation rate is high and in such instances, it is desirable to have even larger open spaces between adjacent tubes. In these cases, it is preferred to use insoluble spacers which serve at the same time as anchoring agents. Either separate rings 20 or for ease of manufacturing continuous spirals 22 of bands or threads are used for this purpose. For reasons of ease of stacking it is advantageous to keep the width of the rings or spiral tape smaller than about 1/6 of the space in between. They must, of course, be narrower than ⅓ of the repeat distance and should not be much narrower than 1/30 in order to conserve the strengthening role they have to play. The preferred range is 1/6 to 1/12.

Figure 4C:
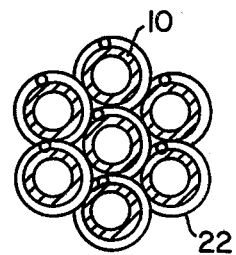

FIG. 4 depicts an assembly of 3 or more tubes 10 bonded by spacers 20 or 22. It should be noted that it is not essential to place spacers on every individual tube, but the tubes must then be stacked in an alternating fashion. Therefore, for ease of assembly, it is preferred to use spacers on each tube.

In order to keep the porous tubes at a preselected distance from each other, a cement is applied to a chemically inert, preferably fibrous, spacer material 20 or 22 such as string, tow, ribbon, gauze, etc. Materials of choice are cotton, polyamide, polyester, asbestos and the like. This spacer is wrapped around the porous tubes and the tubes are then stacked into bundles in such a way that the spacers make contact with adjacent tubes (FIGS. 4a, b, c).

The exact geometry of packing of the tubes within the sheaf is not critical but for two reasons the hexagonal packing is preferred: First, each (non marginal) tube being surrounded by six neighbors, this arrangement makes maximal use of the strengthening effect; second; the hexagonal array makes most efficient use of space and is best suited to be installed into cylindrical shells and to be adapted to the conventional sanitary fittings. In the recommended hexagonal packing the most likely multiples of tubes are 3, 7, 19, 37, 61, 85 and the like.

The distance between tubes is governed by the thickness of the spacers used and should be determined as a function of total permeate flux expected. Ultrafiltration modules containing 19 tubes or less as well as reverse osmosis modules can be constructed with spacers as small as 1 to 2 millimeters. Larger modules (37 tubes and up) which produce a high flow of permeate may necessitate spacers of 2 to 4 millimeters to permit the escape of the permeate without creating a congestive back pressure.

Figure 5A:
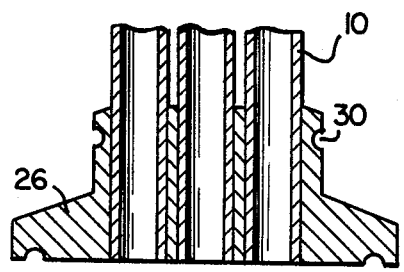
Figure 5B:
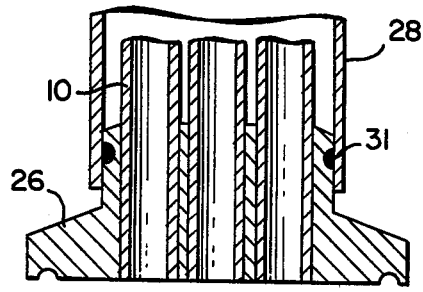

FIG. 5 depicts two cross-sectional views of the header or tube sheet 26 wherein the tubes 10 are affixed in a manner to eliminate crevices for ease of cleaning, and yet provide for attachment to the module shell 28 in those instances when a shell is employed. For example, a split sheet can be constructed of a suitable rigid material such as metal, glass or plastic; the parts of this shell may be independent or may be hinged for convenience. If such a shell is used, the groove 30 provided on the outside of the header 26 accommodates an elastomer O-ring 31 which assures an essentially tight fit between shell 28 and header 26, but which allows for an axial differential expansion on temperature variations.

Figure 6:
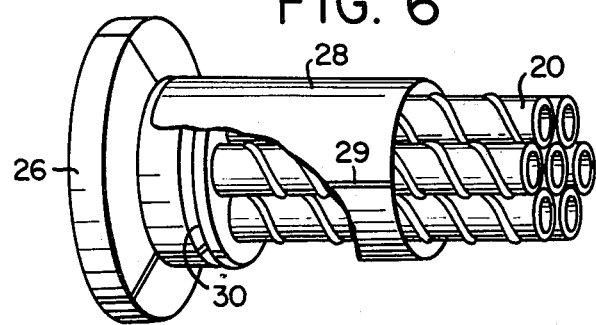
FIG. 6 is a perspective view of a module shell which can be fixed around the header and yet allows for slight relative movement due to differential thermal expansion between the tube sheaf and the shell.

FIG. 6 depicts a view of the header 26 affixed to tubes 10 and shows a partial cutaway of the shell 28 and groove 30 into which fits the elastomeric O-ring (not shown) and which permits the shell to undergo differential thermal expansion.

Figure 7A:
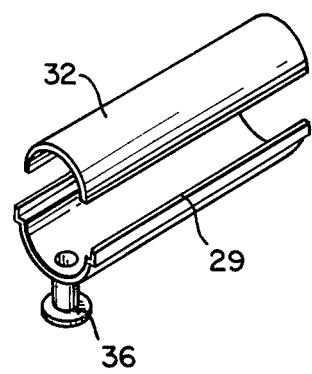
FIG. 7 are perspective and end views of a typical module shell.
Figure 7B:
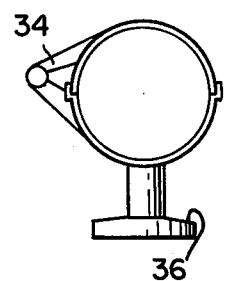

FIG. 7 depicts a perspective and end view of a typical module shell. It is convenient to shape the longitudinal edges 29 of the half shells in a way to assure easy and positive closure. A lip type design 32 and a hinged shell 34 are shown, but a tongue-and-groove or similar design is also practical. The two parts of the half shell are not necessarily of the same size but are nearly so to insure an easy access to the tube sheaf for inspection and cleaning. Thus, two aspects are essential to this invention: The shell is easily removable without necessarily disconnecting the module and the locus of differential expansion is shifted from the tube/header interface to the header/shell interface.

Figure 8:
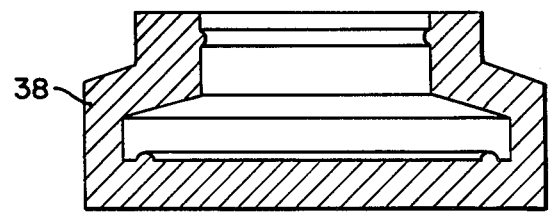
FIG. 8 is a cross-sectional view of a typical mold in which the header can be cast.

FIG. 8 depicts a cross-sectional view of a mold 38 in which the header or tube sheet can be cast.

At least one of the half-shells is equipped with a port 36 for removing permeate. It is convenient to locate this port close to one end of the module and to provide it in turn with a sanitary fitting. The shells are held in position by any suitable quick release fastener device which may or may not be an integral part of the shell.

In practice, the tubes can be bonded to each other by one of several means. For instance, the tubes can be bonded together by cements which fill the following requirements:

(a) wetting of the surface of the porous tube;

(b) chemical stability in the process liquids to be processed by the system;

(c) thermal stability at use temperature;

(d) adhesion (bonding) to the porous tube not significantly weakened by the liquids and cleaners;

(e) at the time of application of the cement a limited penetration into the porous matrix (penetration sufficient for anchoring but not enough to significantly reduce the permeating path). Permeation of 0.001 to 0.05 cm have been found to be satisfactory.

The cements used are caused to harden by suitable means in such a way that on hardening they permanently bond adjacent tubes together. "Suitable means" depends on the nature of the cement as will become clear from the discussion of their chemical composition.

The "cement" can be a viscous solution of a polymer in a solvent or a mixture thereof. The solvents are selected to be relatively volatile and in this case the "suitable means" of hardening consists of evaporation of the solvent at ambient or elevated temperature, in general in a gentle stream of air. Examples of such solvent-based cement are alkyl acrylate in ketones and/or Esters; polyvinyl chloride in tetrahydrofuran and/or Cellosolve ®; polysulfone in dichloroethane and the like. Solvents which are very hygroscopic should be avoided to prevent the precipitation of the polymer under the influence of condensation of air-borne humidity. Bonds made of precipitated polymer are inferior in strength.

Another class of "cements" that can be used are the thermosetting resins such as phenolics, melamines, epoxy and similar resins. The preferred ones are those which are liquid before curing and can therefore be easily impregnated into the fibrous spacer. In the case of thermosetting resins, the "suitable means" signifies curing, either at ambient or at elevated temperature.

In order to achieve the desired strengthening of the tube bundle the "cement" used has to be tough, more rigid than flexible. A typical elastomer (e.g. rubber silastic) is a poor choice as it allows some relative displacement of the tubes which, in turn, can lead to bowing followed by buckling and breakage.

During the actual process of curing the tube bundle is concentrically squeezed either by a series of tight elastic loops or by a specially constructed jig. Care should be taken at this stage, when the stiffening bonds are being formed, that the sheaf is straight, if necessary by forcing it into shape before curing is complete. The straighter the sheaf, the higher end-on loading it can take without breaking.

After curing of the anchoring-spacers is complete, the ends of the sheafs are cut perpindicularly to their length in such a way that the cut surfaces are smooth and all tubes are exactly of the same length. This will assure a tight seal free of crevices with the tube sheet (or header) as discussed below.

In the preferred configuration of this invention the tube sheet (or header) is at the same time also the member (flange) that serves to connect the module to the piping system (the "loop") of the ultrafiltration reverse osmosis unit. While there exists a multitude of possible designs for this member, the preferred one is inspired by the flanges used in sanitary food processing equipment. The advantage of this design is that it is held together by a single clamp, demountable without the use of tools. In addition, if properly constructed, it yields a header free of crevices which is therefore admissible to exacting food applications.

A suitable split mold is fabricated with surfaces of high polish. Instead of such a permanent solid split mold, an elastomeric mold can be used which, because of its deformability does not have to be split. The general shape of this mold is shown in FIG. 8. A suitable elastomer for this application is a polyurethane.

The consolidated bundle of tubes is then placed well centered into the mold in such a way that the openings of the tubes are closed off by the bottom of the mold. When the resin is poured into the mold, it cannot rise into the tubes because of their close contact with the mold. It is advantageous to fill the mold first slightly higher with the liquid resin and then drop its level by about 1 to 2 mm to the final height. This manipulation assures a favorable contact angle between header and tubes i.e. a configuration which presents no crevices for growth of microorganisms.

The resin to be used as a header-flange material has to satisfy all of the following conditions: (1) nonporous body and surface; (2) toughness (tensile strength >3000 psi, flex. mod. >150,000 psi); (3) minimal shrinkage on solidification, (4) wetting of porous tubes; (5) adhesion to tubes in presence of process liquids and cleaners; (6) chemically resistant to process liquids in contact, and (7) thermally stable at use-temperature.

The resin used to form the flange-header is selected from the group of thermosetting resins such as phenolics, melamines, epoxies, and the like. Both filled and unfilled resins may be used. As in the case of the resins used to the anchoring spacers, it is desirable for good bonding to have the resin slightly penetrate the surface of the porous tubes; penetration less than 0.01 mm is sufficient. Because of this requirement, resins with relatively low initial viscosity are preferred. The use of molten polymers rather than thermosetting resins is for the above reasons less satisfactory, although in a suitable injection molding equipment, the generated pressure could enhance the penetration of the melt.

The use of polymer solutions to form the header is not recommended because of the necessity of low shrinkage on solidifying. However, polymer solutions may be used to promote wetting of the porous tubes e.g. polysulfone resin dissolved in methylene chloride may be painted over the ends of the tubes as a primer. The so primed tubes can now be potted into a polysulfone melt because the resin has already wetted the pores in the priming operation.

The result of the operations described above is a module header-flange as illustrated in FIG. 5a which performs all of the following functions simultaneously; it ties the tube ends solidly together, it provides a leakproof connection between the porous tubes and the header surface, it provides a mechanical means to incorporate the module into a reverse osmosis ultrafiltration loop.

After the above header is made, the tube bundle is inverted and an identical header is constructed at its other end.

The module so constructed can be used for ultrafiltration without the necessity for a shell because it is essentially self supporting. The permeate appearing on the outside of the porous tubes can be collected by any suitably shaped trough which is not necessarily attached to the module. Several modules can be positioned above a pan which collects the filtrate. The modules can also be placed inside a cabinet for protection from mechanical damage.

The improved device of this invention is particularly well suited for use in the ultrafiltration apparatus of U.S. Pat. No. 3,977,967 which is assigned to the same assignee as this invention and the disclosure of that patent is therefore incorporated herein by reference.

As indicated in the referenced patent the preferred tubular members are those composed of porous carbon which have a pore volume of at least about 0.08 cc/gm in the distribution peak in the pore diameter range wherein the majority of the pores are from about 0.1 to about 2.0 microns in diameter. The tubes have a typical internal diameter from about 0.3 centimeters to about 3.0 centimeters and also contain a substantially uniform continuous porous coating of preformed aggregates of metal oxide particles, such as zirconia, having an average mean size of less than 5.0 microns. Preferably, the metal oxide particles have an average mean particle size of from about 0.1 to about 1.0 micrometer. The coating is also from about 0.01 microns in thickness without substantial penetration into the tube wall.

By the term "sterilizably mounted" as employed herein and in the appended claims is meant that the juncture between the tubular members and the header or tube sheet is rigid and non-porous and has smooth surfaces free of crevices or depressions which would otherwise be conductive for microbiological growth and hence, difficult to sterilize.

The contrast, by the mounting technique disclosed in U.S. Pat. No. 3,977,967 (see FIG. 4), the individual tubes can undergo slight movements inwardly or outwardly in the tube sheet 34 and hence can trap foreign materials such as bacteria.

The following examples illustrate the best mode presently contemplated for the practice of this invention:

EXAMPLE 1

A 6-tube module was constructed as follows: Seven carbon tubes (10 mm OD and 6 mm ID and 120 cm length) were held together by 4 elastic bands in a hexagonal pattern. A free flowing resin mix was prepared from 100 parts Hysol R9-2039 and 20 parts H-3840 and through a hypodermic needle a continuous line was extruded along the contact line of adjacent (outside) tubes. The resin cured in 24 hours at room temperature to a hard cement. The central tube was pulled out and the two ends of the 6-tube bundle were cut with a carborundum wheel to form a smooth perpindicular face like shown in FIG. 1c.

A flexible mold like the one in FIG. 8 was made from Flexane #60 (Devcon) using a stainless steel sanitary flange (Triclover 1½") as a template. (The opening of the flange was closed off by a Hysol resin plug to give the necessary smooth finish required.) After the elastomer has cured, the mold (shown in FIG. 8) could be peeled off the model.

The 6-tube sheaf was clamped in a vertical position with the tube ends pressing against the interior bottom of the flexible mold. A potting resin made from 100 parts Epon 815, 15 parts tetramine and 2 parts Silane was then poured around the tubes into the mold and was cured for 24 hours at room temperature before unmolding.

The same procedure was repeated with the other end of the sheaf.

The resulting 6-tube (spacer-less) module could be easily and effectively clamped to standard sanitary piping with conventional sanitary clamps.

The module was then subjected to an end-on load. At 90 kg total or 15 kg per tube, no breakage occured and the initial curvature just doubled (from $1.4 \times 10^{-3}$ to $2.8 \times 10^{-3}$). This compares with 3.6 kg breaking strength for an individual tube.

Inspection by microscope shows that the surface blind over (as shown in FIG. 1) by the epoxy resin used is an average of 2 mm wide, i.e. approximately 6% of the total external surface.

EXAMPLE 2

Seven carbon tubes (10×6 mm×120 cm) were wrapped individually by a spacer made from a cotton 2 mm 12 ply string (polished twice #48) which was pulled through a funnel containing a resin made from 100 parts Epon 815, 15 parts Tetramine and 2 parts of silane. The tubes were stacked into a hexagonal pattern and were squeezed together by 6 rings of stretched rubber bands. The sheaf was then supported in a horizontal position in such a way that the tubes were straight enought to permit visual contact from one end to the other and were stored 24 hours at room temperature to permit the resin to cure.

The spacer was applied in such a fashion that adjacent pitches were 62 mm from each other and all tubes were wrapped in the same direction. The headers were prepared by the same technique as in Example 1.

Although the invention has been illustrated by preceding examples, it is not to be construed as being limited to the materials employed herein, but rather, the invention encompasses the generic area as hereinbefore disclosed. Various modifications can be made without departing from the spirit and scope thereof.

What is claimed is:

1. In an ultrafiltration and reverse osmosis device including a module shell containing a plurality of axially aligned, longitudinally coextensive, hollow, porous carbon tubes disposed in a permeate collection zone, all of said tubes having an internal diameter of from about 0.3 centimeters to about 3.0 centimeters and average pore diameters, at least 50 percent of which are within the range of from about 0.1 to about 2.0 micrometers, and having an internal coating of aggregates of metal oxide particles; the improvement whereby means are provided for rendering said device mechanically strong and able to withstand substantial axial compression without fracture of said tubes and at the same time is rendered more amenable to cleaning and sterilization, said improvement comprising an elongated, rigid, self-supporting pack of said hollow, porous carbon tubes bonded and sealed together at each end by an inert, rigid, high strength, thermally stable header-flange member defining substantially smooth, crevice-free surfaces thereon, at least one of said surfaces is substantially flat and lies in a plane which is substantially perpendicular to the longitudinal axis of said tubes and which is substantially coincident with the ends thereof, and said porous carbon tubes bonded together at spaced intervals along their outer surfaces, between and spaced from said header-flange members, by a plurality of cement deposits providing means for preventing relative axial movement of individual tubes with respect to one another and for permitting permeate passing through the walls of said tubes to flow freely between adjacent tubes, both the cement deposits and said header-flange members being composed of a hard, rigid, chemically and thermally stable resinous composition which is liquid and flowable before curing and when applied to said tubes thereby penetrates into the porous matrix of the tubes a short distance sufficient to anchor and prevent axial displacement of the tubes, and said module shell enclosing said pack of hollow carbon tubes and slidably engaging at least one header-flange member at one end of said module shell.

2. The device of claim 1 wherein said tubes are bonded together at spaced intervals through a plurality of individual ring-shaped spacers containing a cement on at least one surface thereof encompassing at least some of said tubes.

3. The device of claim 1 wherein said tubes are bonded together at spaced intervals through a helically wound spacer containing a cement on at least one surface thereof encompassing at least some of said tubes.

4. The device of claim 1 wherein said tubes are provided with an internal coating of aggregates of metal oxide particles having an average mean particle size of from about 0.1 to about 1.0 micrometers.

5. The device of claim 4 wherein said metal oxide is zirconia.

* * * * *